United States Patent [19]

Arinobu

[11] Patent Number: 4,819,124
[45] Date of Patent: Apr. 4, 1989

[54] OVERCURRENT DETECTOR AND CIRCUIT BREAKER

[75] Inventor: Ichirou Arinobu, Fukuyama, Japan

[73] Assignee: Mitsubishi Denki Kabushiki Kaisha, Tokyo, Japan

[21] Appl. No.: 77,372

[22] Filed: Jul. 24, 1987

[51] Int. Cl.$^4$ .............................................. H02H 3/08
[52] U.S. Cl. ........................................ 361/97; 361/96; 361/87
[58] Field of Search ................. 361/93, 94, 95, 96, 361/97, 78, 85, 87

[56] References Cited

U.S. PATENT DOCUMENTS

| | | | |
|---|---|---|---|
| 3,846,675 | 11/1974 | Shimp | 361/100 |
| 4,246,623 | 1/1981 | Sun | 361/94 |
| 4,429,340 | 1/1984 | Howell | 361/96 |
| 4,550,360 | 10/1985 | Dougherty | 361/93 |
| 4,589,052 | 5/1986 | Dougherty | 361/96 |
| 4,672,501 | 6/1987 | Bilac et al. | 361/96 |
| 4,685,024 | 8/1987 | Martellock et al. | 361/96 |

FOREIGN PATENT DOCUMENTS

0133968 3/1985 European Pat. Off.
3114213 2/1982 Fed. Rep. of Germany.
60-32211 2/1985 Japan.

Primary Examiner—M. H. Paschall
Assistant Examiner—H. L. Williams
Attorney, Agent, or Firm—Lowe, Price, LeBlanc, Becker & Shur

[57] ABSTRACT

A solid state overcurrent detector is provided with a current sensor means (200) having an OR circuit (130) connected by its input terminals to output terminals of burden circuits (41,42,43). A phase selecting circuit (400) for selecting the largest phase is connected by its input terminals to the output terminals of the burden circuits. The output terminal of the phase selecting circuit (400) is connected through a signal converting circuit (90) and an A/D converter (100) to a microcomputer (110) having a first level-discrimination circuit (1001) and a first time-current operation circuit (1002) with inverse time-current characteristics for various time interruptions responding to an amount of overcurrent. The output terminals of the OR circuit (130) are connected through a second level-discrimination circuit (140) to a second time-current operation circuit (150) for instant interruption.

8 Claims, 8 Drawing Sheets

OVERCURRENT DETECTOR AND CIRCUIT BREAKER

FIELD OF THE INVENTION AND RELATED ART STATEMENT

1. FIELD OF THE INVENTION

The present invention relates generally to a circuit breaker, and more particularly to that improved of its detecting characteristic.

2. DESCRIPTION OF THE RELATED ART

FIG. 1 shows a circuit breaker of a prior art disclosed in published unexamined Japanese patent application SHO No. 60-32211. In FIG. 1, on a set of power lines, namely R, S and T of three phase power lines 10, current transformers 21, 22 and 23 of a current sensor means 200 are provided, respectively. Full-wave rectifiers 31, 32 and 33 are connected with its two input lines across both output lines of the current transformers 21, 22 and 23, respectively. Burden circuit 41, 42 and 43 are connected with their input lines to output lines of the full-wave rectifiers 31, 32 and 33, respectively, and each one of the input lines of the burden circuits 41, 42 and 43 are connected in common to the ground. The other output terminals of the burden circuits 41, 42 and 43 are connected to input terminals of an OR circuit 130, which consists of three diodes 131, 132 and 133, and output terminal of which are connected in common as an output terminals of the OR circuit 130. Adjustable output terminals of the burden circuits 41, 42 and 43, wherefrom output signals can be obtainable in desirably adjusted levels, are connected to input terminals of mean/effective value circuits 91, 92 and 93 of mean/effective value means 90, which are for producing mean values or effective values of the signals from the burden circuits 41, 42 and 43. The output terminals of the mean/effective value circuits 91, 92 and 93 are connected to input terminals of OR circuit 160 which consists of three diodes 161, 162 and 163 and issues output signal to the A/D converter 100. A microcomputer 110 is connected to the output terminal of the A/D converter 100. The output terminal of the OR circuit 130, as a second output terminal of the sensor means 200, is connected to the A/D converter 100 and the microcomputer 110 through a power source circuit 300, which is generally a constant voltage circuit. Furthermore, the second output terminal of the current sensor means 200 is connected to a second level discrimination circuit 140 which, for instance, comprises at least one zener diode. The second level discrimination circuit 140 is connected to a second time-current tripping circuit 150. Output terminals of the microcomputer 110 and the second time-current operating circuit 150 are connected to an output circuit 120 through an OR gate 121. The output circuit 120, for instance, comprising a thyristor, actuates a releasing device 80 for carrying out disconnection of line switches 201, 202 and 203. An indicator 180 is for indicating that the releasing device 80 has operated. The microcomputer 110 comprises a first level discrimination means and a first time-current operating means as is described later herein.

The current sensor means 200 issues from the mean/effective value circuit 90 signals corresponding to mean values or effective values of the current in the power lines R, S and T, and also issues from the OR circuit 130 the second output signals corresponding to peak value of the current in the power line R, S and T. The second output signal of the current sensor means is given through the second level discrimination circuit 140 to the second time-current operating circuit 150. The A/D converter 100 and the microcomputer 110 are fed with a constant voltage D/C current from the power source circuit 300.

When overcurrent(s) flows in the AC power lines 10, output currents of the current transformers 21, 22 and 23, which are coupled to the AC power lines R, S and T of the AC power lines 10, correspondingly produces output currents at predetermined transforming ratio. The output currents are rectified by the full-wave rectifiers 31, 32 and 33, respectively. The rectified output currents of the full-wave rectifiers 31, 32 and 33 are fed to respective burden circuits 41, 42 and 43. The output signals of the burden circuits 41, 42 and 43 are transformed into mean values or effective values thereof by mean/effective value circuits 91, 92 and 93 of the mean/effective value circuit 90. A largest signal among the output signals of the mean/effective value circuits. 91, 92 and 93 is given to A/D converter 100. This digital signal is fed to the microcomputer 110. The microcomputer 110 carries out level discrimination of digital input signal thereto in accordance with a predetermined program stored in the read-only memory 114. Furthermore, basing on the results of the level discrimination, a predetermined time-current operation is carried out, thereby to issue output signal. That is, the microcomputer 110 functions as the first level discrimination means and the first time-current operation means. The above-mentioned time-current operation is carried out, for instance, along the inverse long time-current characteristic of part A of FIG. 2. The output signal issued from the microcomputer 110 is fed to the gate of the thyristor 120, which is then turned on the drive the output device 80. Accordingly, the overcurrent indicator 180 indicates the occurrence of the overcurrent and at the same time the releasing device 80 actuate the interrupting connectors 201, 202 and 203. The above-mentioned time-current characteristic of the curves A, B and C are designed by taking account of the capacity of fuses in the upstream part of the power line 10.

On the other hand, the output of the full-wave rectifier 31, 32 and 33 are given to the OR circuit 130 comprising diodes 131, 132 and 133. Since the output terminal of the OR circuit 130 is connected to the second level discrimination circuit 140 which, for instance, comprises at least one zener diode, when one input signal to the OR circuit 130 exceeds the second level, the discrimination circuit 140 gives output signal to the second time-current operating circuit 150, which accordingly carries out necessary time-current operation, and thereby triggers the gate of the thyristor 120. The time-current operation in this case is, for instance, as shown by the part B of the short time current inverse characteristic or the part C of instantaneous time-current characteristic. By the above-mentioned turn-on of the thyristor 120, the output device 80 is actuated, thereby its indicator 180 indicates the kind of the overcurrent and also drives the interruption connectors 201, 202 and 203.

In such prior art circuit breaker, mean/effective value circuit is necessary for respective phase. Therefore, the circuit becomes complex and expensive. Further, adjusting operation is necessary for averaging the outputs of the mean/effective value circuits. Therefore, the production process becomes complex, too.

OBJECT AND SUMMARY OF THE INVENTION

It is an object of the invention to provide an overcurrent detector having simple circuit without above-mentioned adjusting operation.

An overcurrent detector in accordance with the present invention comprises, current sensor means provided for respective phases of AC power lines for detecting a value of current, phase selecting means for selecting a largest output value phase wherein largest value of the sensing outputs exists, peak value detection means for detecting largest instantaneous value from instantaneous values of the sensing outputs, signal conversion means for obtaining a mean square ($Im^2$) of output of the phase selecting means, processing means which processes output signal of the signal conversion means to issue a releasing signal.

A circuit breaker in accordance with the present invention comprises, a disconnectable contact provided in an A.C. power line, current sensor means provided for respective phases of AC power lines for detecting a value of current, phase selecting means for selecting a largest output value phase wherein largest value of the sensing outputs exists, peak value detection means for detecting largest instantaneous value from instantaneous values of the sensing outputs, signal conversion means for obtaining a mean square ($Im^2$) of output of the phase selecting means, processing means which processes output signal of the signal conversion means to issue a releasing signal, releasing means for actuation of disconnection of the disconnectable contact in response to the releasing signal, While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Hereinafter, details of the invention is described with reference to the drawings.

Figure 3:
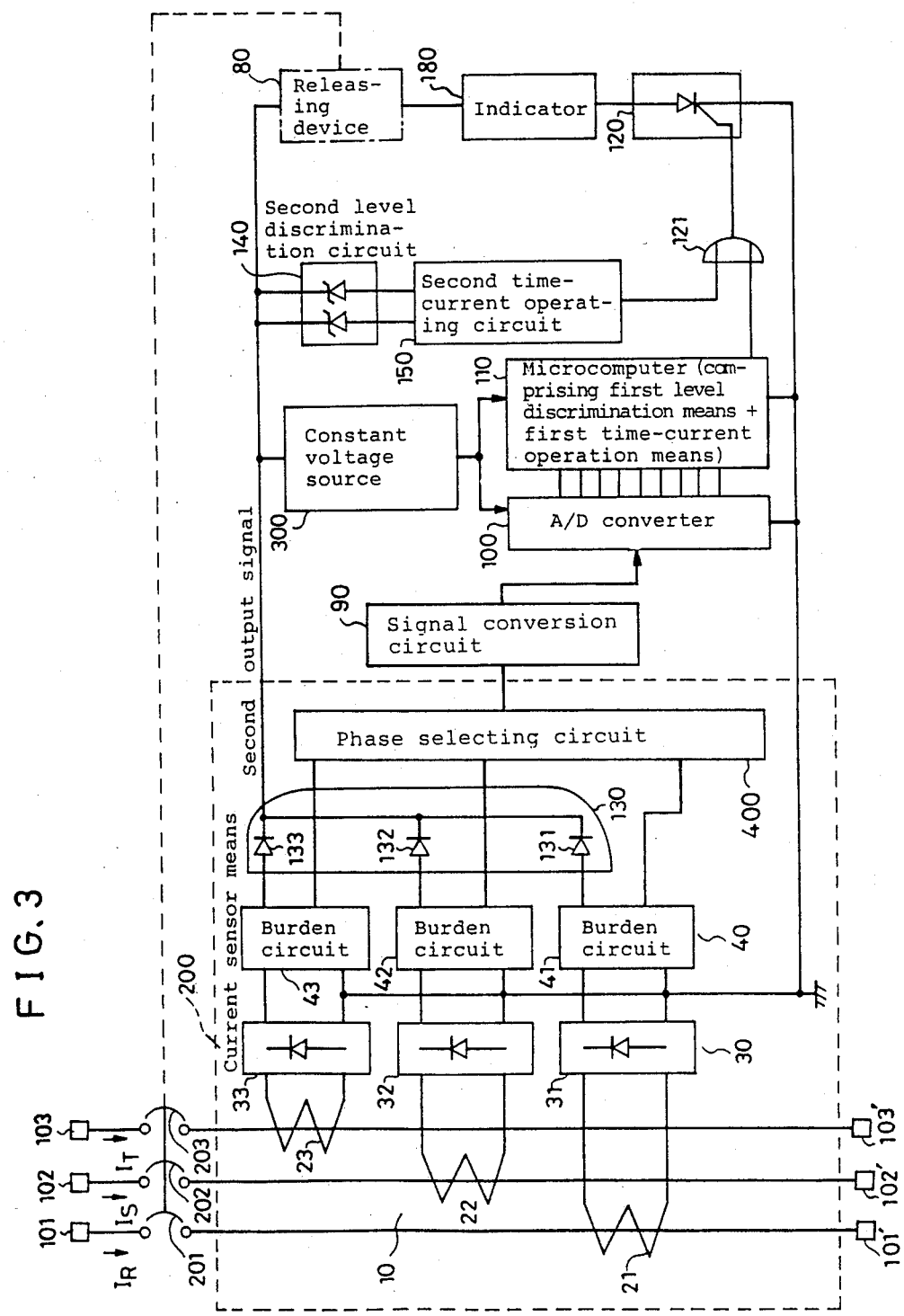
FIG. 3 is a circuit block diagram of a first embodiment in accordance with the present invention.

In FIG. 3, on a set of power lines R, S and T of three phase power lines 10, current transformers 21, 22 and 23 of a current sensor means 200 are provided, respectively. Full-wave rectifiers 31, 32 and 33 are connected with its two input lines across both output lines of the current transformers 21, 22 and 23, respectively. Burden circuit 41, 42 and 43 are connected with their input lines to output lines of the full-wave rectifiers 31, 32 and 33, respectively, and each one of the input lines of the burden circuit 41, 42 and 43 are connected to input terminals of an OR circuit 130, which consists of three diodes 131, 132 and 133 and output terminal of which are connected in common as an output terminals of the OR circuit 130. Adjustable output terminals of the burden circuits 41, 42 and 43, wherefrom output signals can be obtainable in desirably adjusted levels, are connected to input terminals of phase selecting circuit 400. The phase selecting circuit 400 selects, and issues one phase signal having the largest waveform from among three phase signals inputted thereto, as the largest value phase signal. And, only the largest value phase signal is inputted into a signal conversion circuit 90 for obtaining a mean square of an inputted value. The converted output signal of the signal conversion circuit 90 is converted from analog signal into digital signal by an A/D converter 100. The digital output of the A/D converter 100 is inputted to a microcomputer 110. The output of the microcomputer 110 is connected to a gate of thyristor 120 for operating a releasing device 80. The releasing device 80 actuates the disconnectable contact to disconnect.

The output of an OR circuit 130 is connected to second time-current operation circuit 150 through zener diodes 140. An output of the second time-current operation circuit 150 is connected to the gate of thyristor 120 for operating a releasing device 80. The releasing device 80 disconnects the disconnectable contacts 201, 202 and 203 in response to on state of the thyristor 120.

Figure 4:
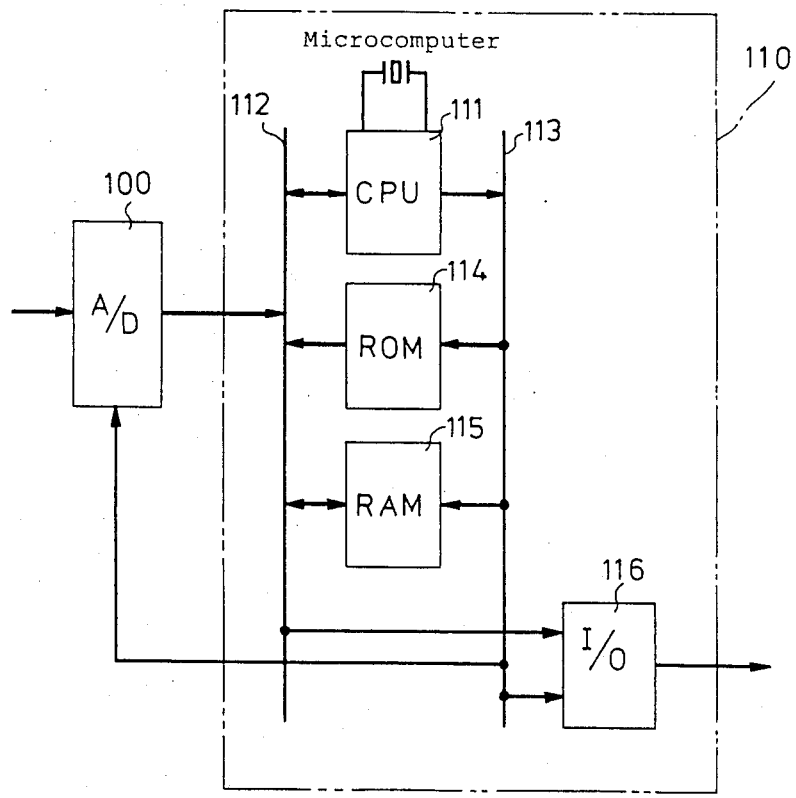
FIG. 4 is a detailed circuit diagram of the microcomputer 110 of the circuit of FIG. 3.

The constitution and processing of the microcomputer 110 are described with reference to FIGS. 4 and 5 hereafter. FIG. 4 is a circuit block diagram of the microcomputer 110. As shown in FIG. 4, the microcomputer 110 comprises a central processor unit 111, a read-only memory 114, a random-access memory 115, and I/O port 116, a data bus 112 and the address bus 113. Parts of the data bus 112 and the address bus 113 are also connected to the A/D converter 100. The read-only memory 114 stores a program for executing necessary signal processing, and also data for a long time characteristic, a short time characteristic and an instant time characteristic of the first time-current operating means. The central processor unit 111 contains clock signal means necessary therefore. The random-access memory 115 functions as a register which is necessary for the signal processing.

Figure 5:
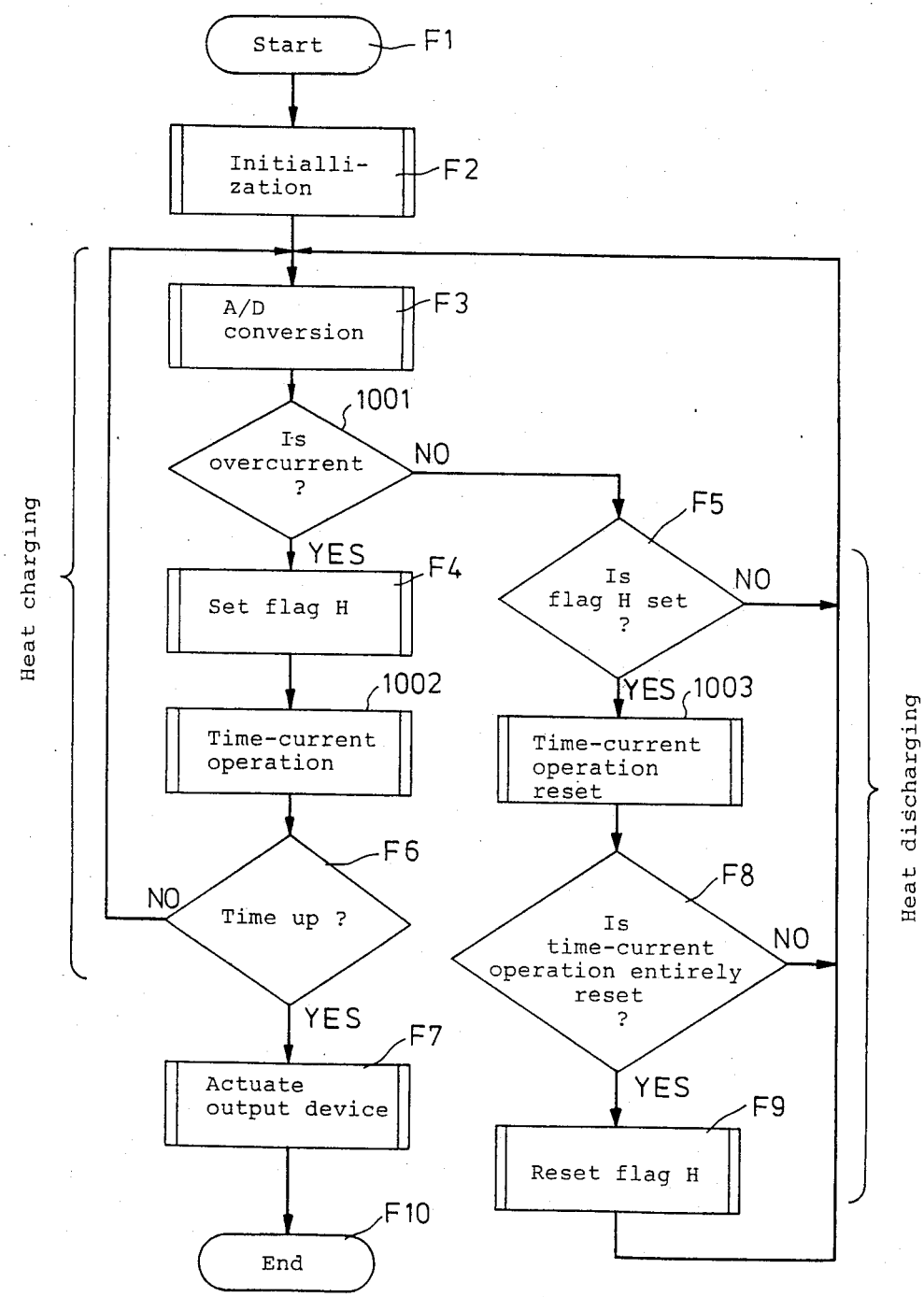
FIG. 5 is a flow chart showing operation of the microcomputer shown in FIG. 4.

FIG. 5 is a flow chart of the computer program for the microcomputer 110. The flow chart contains a first level-discrimination step (a step 1001) and a first time-current operating step (a step 1002) for performing a first time-current operation in response to the output of the first level discrimination means. The flow chart also contains decrement means (a step 1003) for decreasing the registor in response to radiation characteristics.

When overcurrent(s) flows in the AC power lines 10, output currents of the current transformers 21, 22 and 23, coupled to the AC power lines R, S and T of the AC power lines 10, correspondingly produces output currents at predetermined transforming ratios. The output currents are rectified by the full-wave rectifiers 31, 32 and 33, respectively. The rectified output currents of the full-wave rectifiers 31, 32 and 33 are fed to respective burden circuits 41, 42 and 43. The respective phase signals issued from burden circuits 41, 42 and 43 are inputted to the phase selecting circuit 400, and therein one phase signal, which has the largest waveform from among the above-mentioned respective phase signals, is selected and issued as the largest value phase signal. The selected largest value phase is inputted to the signal conversion circuit 90 and converted into signal having mean square thereof. The mean square output is fed to the A/D converter 100 which converts the analog signal into digital signal. This digital signal is fed to the microcomputer 110, which carries out level discrimination step with respect to the digital signal. Further, the microcomputer carries out first time-current operation and issues an output signal from the output port 116. The output signal is fed to the gate of thyristor 120 for driving the releasing device 80 which disconnects the disconnectable contacts 201, 202 and 203.

On the other hand, outputs of the burden circuits 41, 42 and 43 are inputted to OR circuit 130 which consists of the diode 130, 131 and 132. The output of the OR circuit 130 is connected to the second time-current operating circuit 150 through the zener diodes 140 as second level-discrimination. Therefore, when the output of OR circuit 130 is over a zener voltage of the zener diode 140, the output of OR circuit 130 is fed to the second time current operating circuit 150. The second time-current operating circuit 150 carries out the predetermined second time-current operation for triggering the thyristor 120 for driving the releasing device 80.

Figure 1:
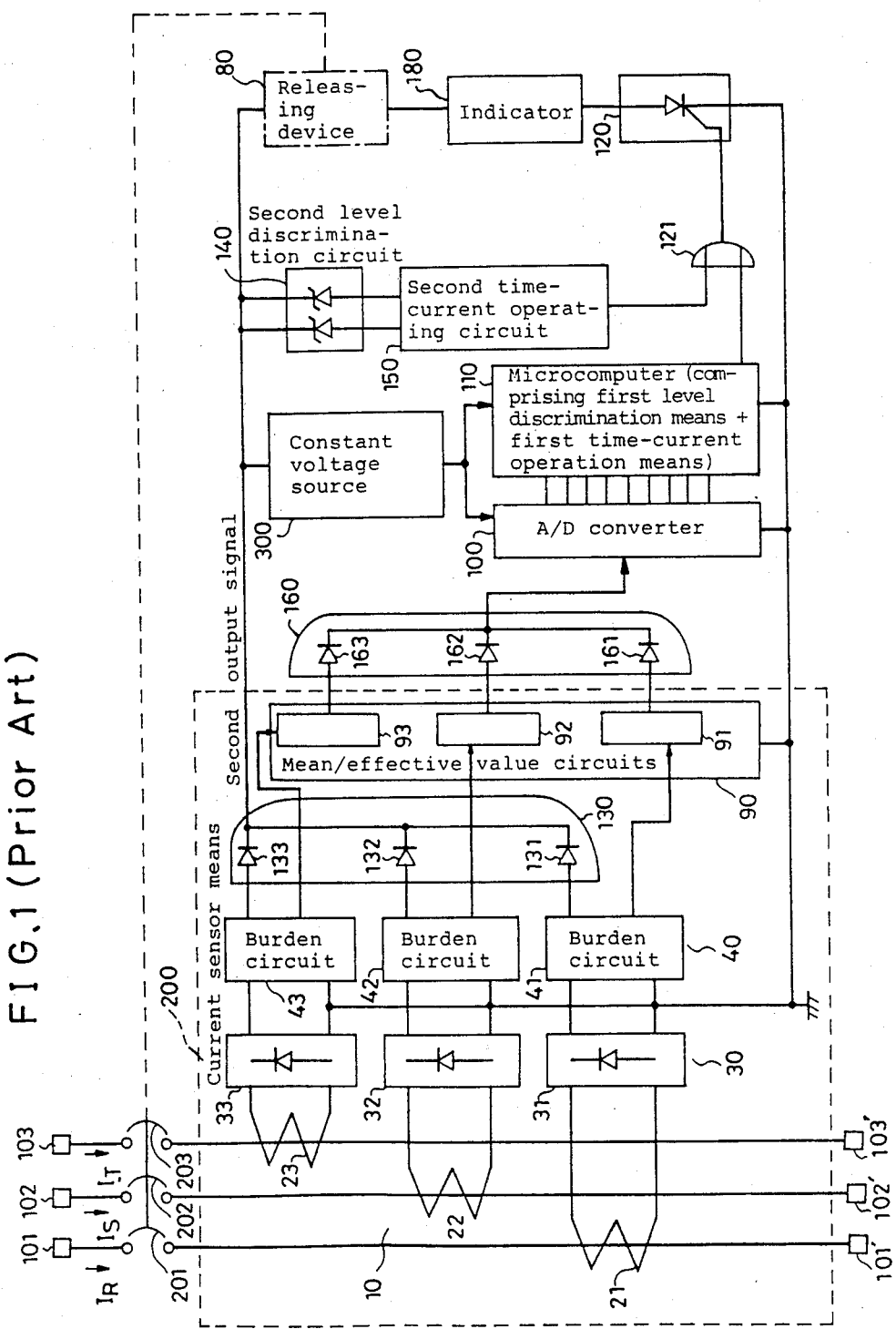
FIG. 1 is the circuit block diagram of over-current detector of the prior art.
Figure 2:
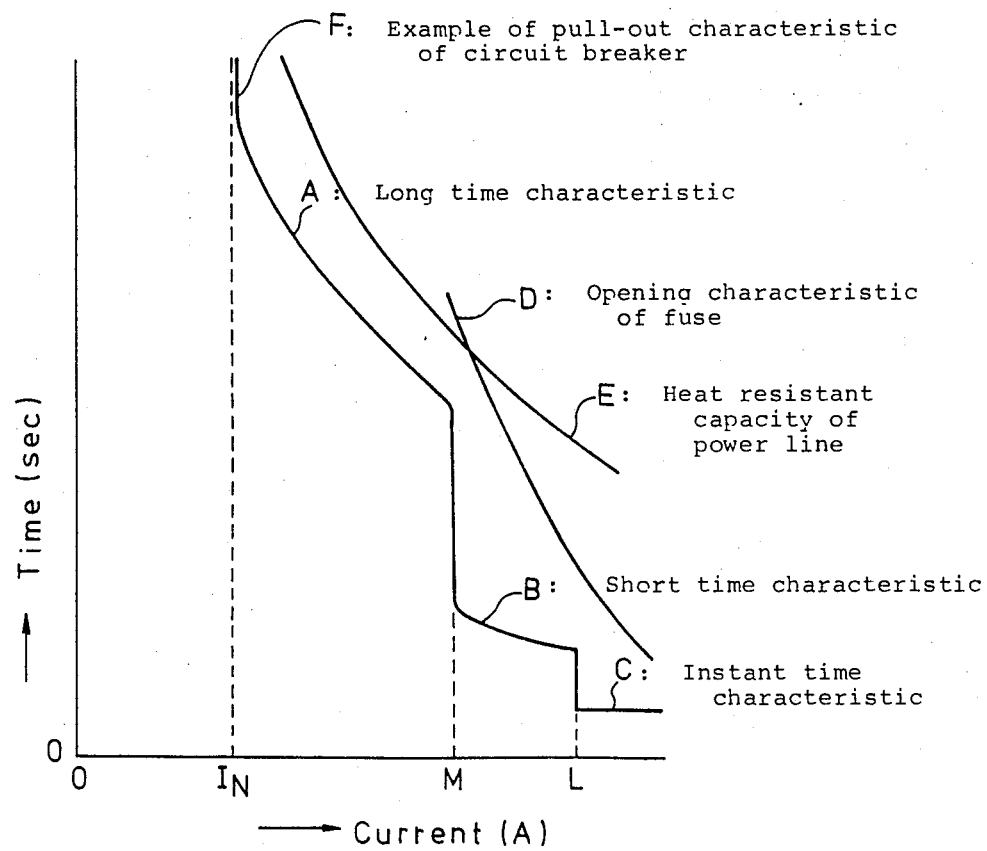
FIG. 2 is the current vs. time characteristic graph of overcurrent detector.

The microcomputer 110 rises up, and then the computer program shown in flow chart of FIG. 5 starts. The system is initiallized (i.e. setting of I/O port, and setting/resetting of flags are made,) at a step F2. Then, the microcomputer 110 controls the A/D converter 100 to convert the output signal of signal conversion circuit 90 into digital signal (step F3). This digital data is stored in a RAM 115. Next, it is determined whether this digital data indicate overcurrent or not (step 1001). When the digital data does not show an overcurrent, the operation jumps from the heat charging routine to the heat discharging routine and then returns to the A/D conversion (step F3). When the digital data shows an overcurrent, a heat charging flag H is set in the step F4, and bits for heat charging is added for every predetermined unit times by utilizing random access memory 115 or a register in the central processor unit 114, so as to count time responding to amount of input signal level. The heat charging bits are selected in order to realize time-current operation along the characteristic curves of FIG. 2. Then, the added bits number is examined whether the time is up for the selected time-current operation of the predetermined characteristic. And a result, when the added bits number does not yet reach the predetermined number, in other words, when the time is up, an output is issued through the I/O port 116 to drive the thyristor 120, and thereby to actuate the first indicator 180 and the output device 80.

Nextly, operation of heat discharging routine, namely, the routine for resetting the time-current operation is described. The steps F5, 1003, F8 and F9 together form a heat discharging routine. It is discriminated whether the heat charging flag H has been set or not (step F5). When the heat charging flag H has been set, the heat charging flag H is decreased at the step 1003 for every predetermined unit times. When the counted number of the bits become 0 as a result of the subtractions in the step F9, the heat discharging routine goes back from the step F9 to the A/D conversion step F3. When the counted number of the bits is not entirely reset, the heat charging flag H is not reset and the heat discharging routine goes back from the step F8 to the A/D conversion step F3.

As above-mentioned, the microcomputer gives most appropriate time-current operating characteristic, taking account of heat charging and heat discharging in the electric power lines and loads. Incidentally, addition or subtraction of the heat charging and heat discharging can be executed in the inverse order to the above-mentioned embodiment.

The calculation for effective value in the microcomputer 110 is described. A/D converted value stored in the registor is converted into $Im^2$ which corresponds to the current Im, where the $Im^2$ is defined as mean square of Im ($Im^2 = 1/T \int Im^2 dt$: T is cycle). On the other hand, the effective value Imrms is defined as follows:

$$Imrms = \sqrt{\frac{1}{T} \int_0^T Im^2 dt} \,, \tag{1}$$

where $T = 2\pi/\omega$ and $\omega$ = angular frequency of Im. The formula (1) is equivalent with following:

$$Imrms = \sqrt{Im^2} \tag{2}$$

To obtain the time-current operating characteristic in accordance with the effective value, the microcomputer 110 calculates the root of the A/D converted value. In other embodiment, the root of the A/D converted values are preliminarily stored in ROM by utilizing the look-up table method.

Figure 6:
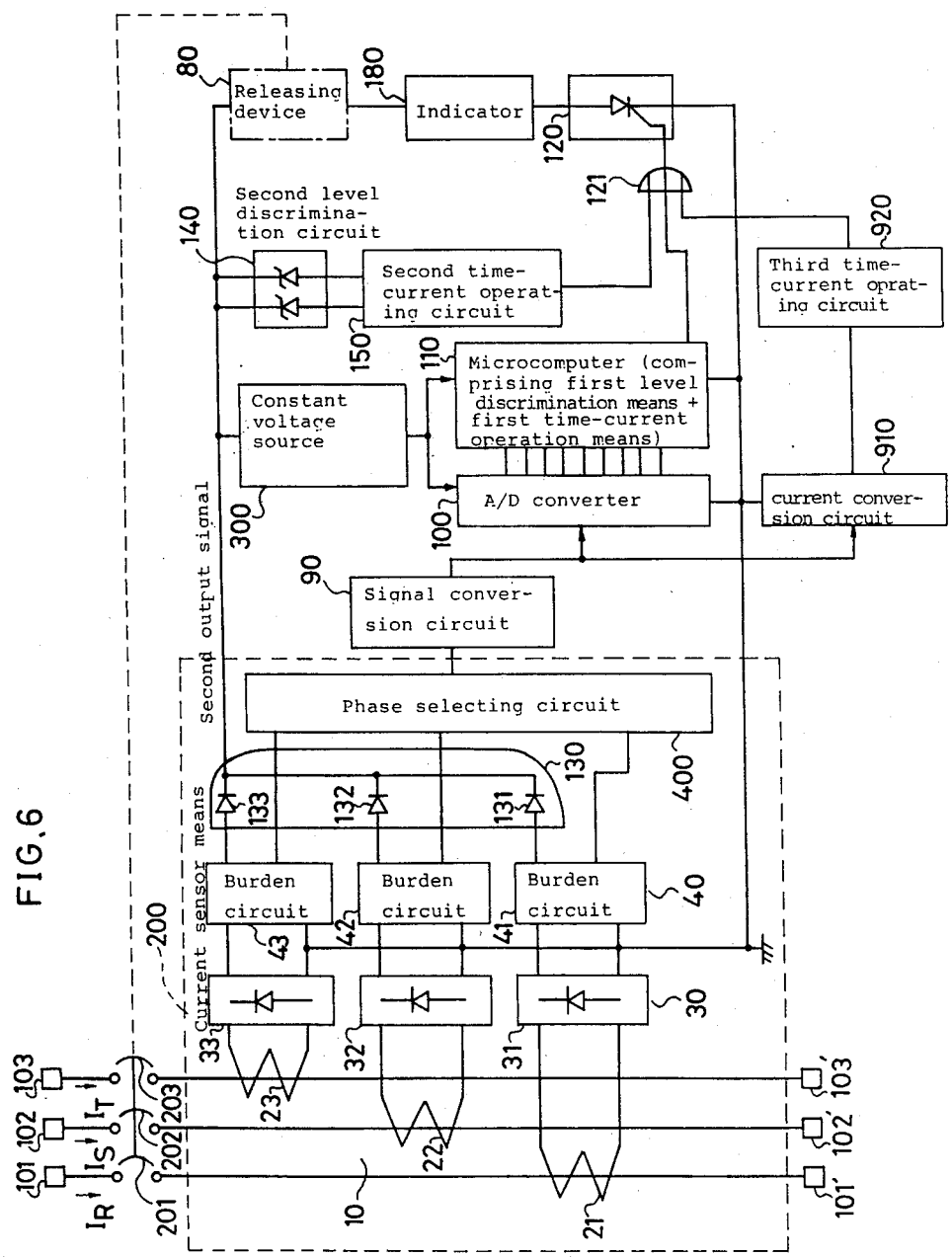
FIG. 6 is a circuit block diagram of a second embodiment in accordance with the present invention.

FIG. 6 shows other embodiment in accordance with the present invention. An output of the signal conversion circuit ($Im^2$) is fed to a current conversion circuit 910.

The current conversion circuit 910 has a function of level discrimination which is provided for carring out the conversion operation only when the inputted signal is over the predetermined level. The current conversion circuit 910 examines whether the output of the signal conversion circuit is over the predetermined level or not. When the output of the signal conversion circuit is over the predetermined level, the current conversion circuit 910 outputs a current corresponding to $Im^2$. An integration circuit and timing circuit which form the time current operating circuit 920, can be realized by combination of capacitance charge circuit comprising known charge circuit and level discrimination element by PUT etc. By charging the current corresponding to $Im^2$, the integration value corresponding to square mean can be obtained. Further, the effective value can be obtained at longer integration time than a time period caused by an overcurrent. Therefore, back-up time-current characteristic of the curve G is easily obtained. When the time is up, the time-current operating circuit 920 issues the output for driving the releasing device 80.

As described above, in this embodiment, as a result of introducing the current conversion circuit 910 and the third time-current operating circuit 920, the protection operation can be carried out even in case of trouble of microcomputer 110. Because the signal converting circuit 900 is provided, the current converting circuit 910 and time-current operating circuit 920 as back-up circuit becomes simple.

In other modified embodiment, the current converting circuit 910 does not have the above-mentioned level discrimination function. In this case, wider range back-up can be achieved.

Figure 8:
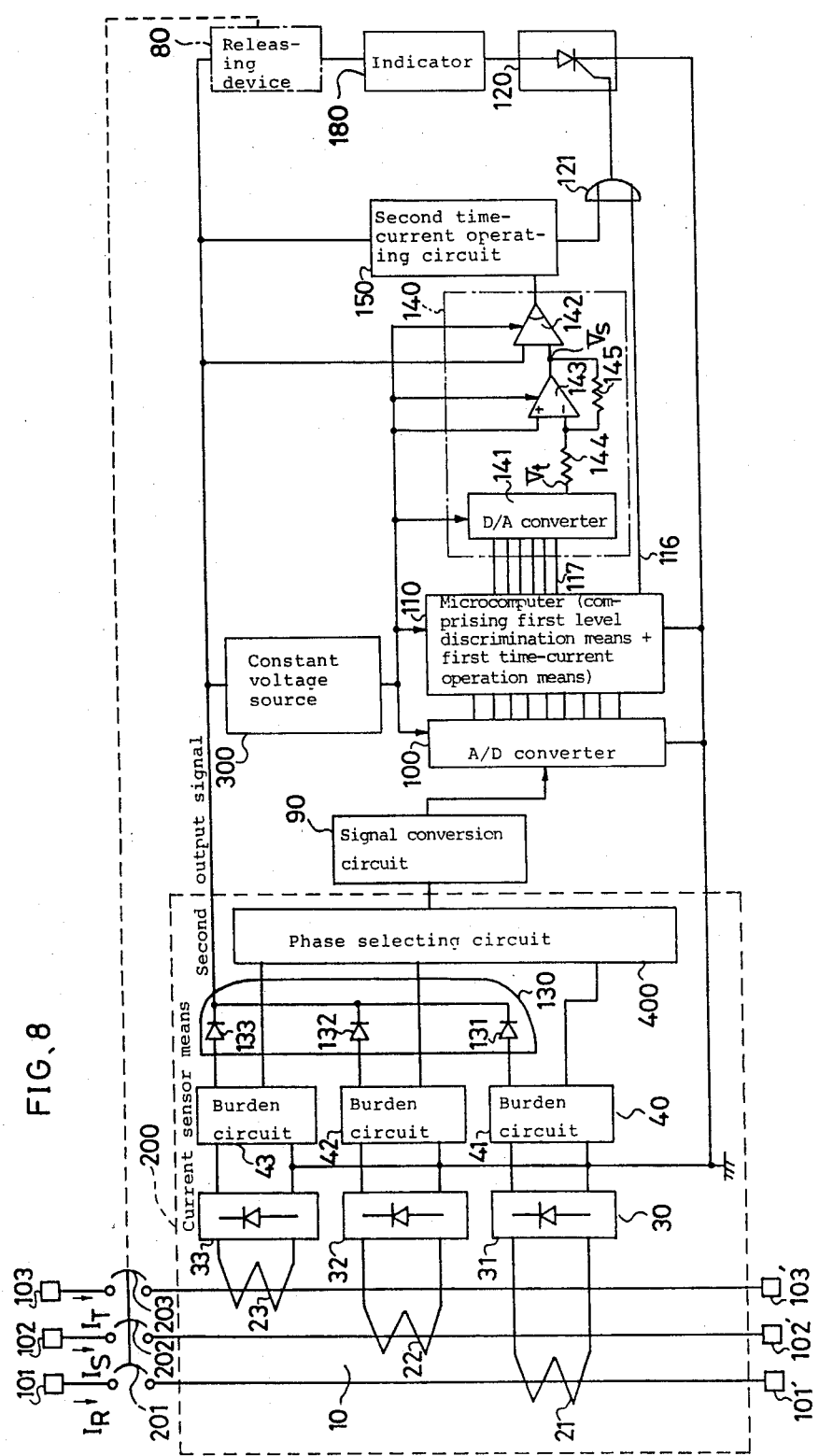
FIG. 8 is a circuit block diagram of still other embodiment.

FIG. 8 shows still other embodiment in accordance with the present invention.

In FIG. 8, the output of a microcomputer 110 is converted into analog signal by D/A converting circuit 141 and then is impressed to an input terminal of the operational amplifier 143. To another input terminal of the operational amplifier 143, a reference voltage Vref is impressed. Where the output of D/A converting circuit 141 is Vt, the output Vs of the operational amplifier 143 is as follows:

$$Vs = 2Vref - Vt.$$

The output Vs is inputted to one input of a comparator 142 as threshold value. To another input of the comparator 142, the output from an OR circuit 130 is inputted. Second level-discrimination means 140 comprises the comparator 142, D/A converting circuit 141 and operational amplifier 143. An output of the comparator 142 is inputted to a second time-current operating circuit 150 as second time-current operating means.

Figure 7:
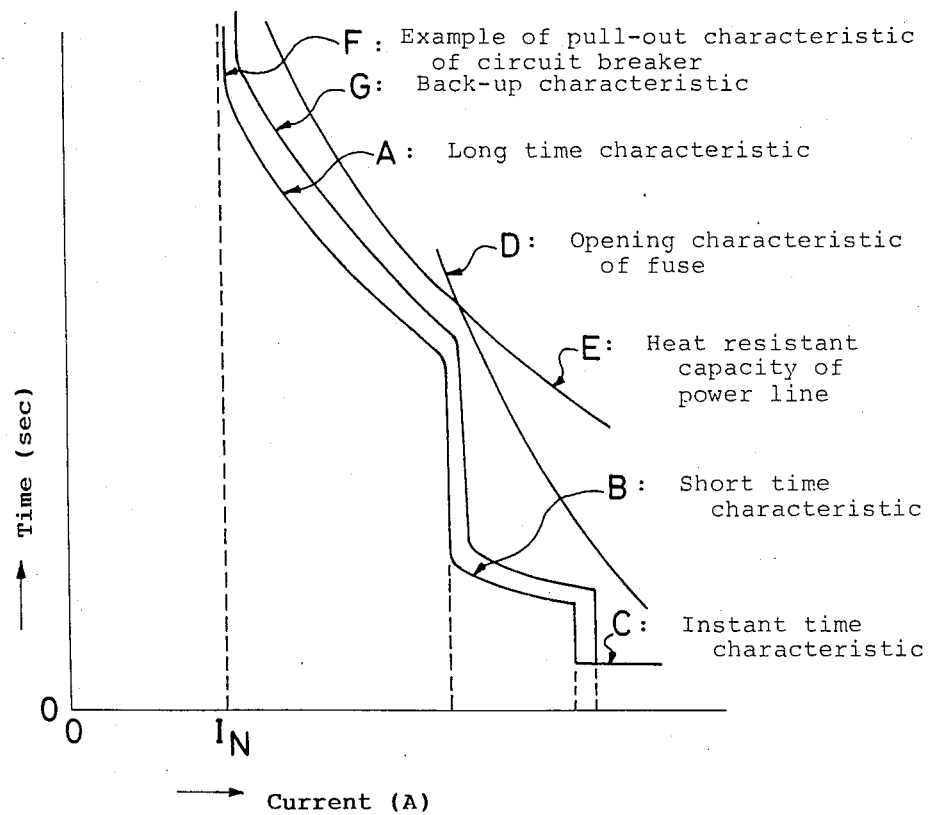
FIG. 7 is a current vs. time characteristic graph of overcurrent detector of FIG. 6.

The rectified output currents of the full-wave rectifiers 31, 32 and 33 are fed to the OR circuit 130 which comprises diodes 131, 132 and 133. The output of the OR circuit 130 is inputted to an input terminal of the comparator 142. When this inputted signal is over a threshold value Vs which is inputted to the other input terminal of the comparator 142, an output of the comparator 142 is reversed and operating signal is inputted to the time-current operating circuit 150. The threshold value is defined by difference between the reference voltage Vref and analog voltage which is converted from digital output having predetermined value of output port 117 of the microcomputer 110 by D/A converting circuit 141. The time-current operating circuit 150 carries out the time-current operation in accordance with the output signal from the comparator 142, and triggers the gate of thyristor 120. The above-mentioned time-current operation is carried out along the instantaneous characteristic (curve C of FIG. 7).

The threshold value can be easily changed by changing the output of microcomputer 110 and can be accurately determined. Even when D/A converting output is not output before rising the microcomputer, the predetermined value is given as the threshold value for second level-discrimination means. Therefore, the protection can be realized even in rising or troubling of microcomputer.

In other modified embodiment, a multiplexer is used instead of OR circuit 130 for selecting the signal with time division.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An overcurrent detector comprising:

current sensor means provided for respective phases of AC power lines for detecting a current value;

phase selecting means for selectively outputting one phase signal having a largest waveform from among three phase signals inputted thereto from said current sensor means by outputting at least one half cycle of said one phase signal.

peak value detection means for detecting a largest instantaneous value from instantaneous values of said sensing outputs;

signal converison means for obtaining a mean square ($\overline{Im^2}$) of output of said phase selecting means; and processing means for processing an output signal of said signal conversion means and an output signal of said peak value detection means to issue a releasing signal.

2. An overcurrent detector in accordance with claim 1, wherein said processing means includes a microcomputer for processing said output signal of the signal conversion means and comprises:

first level-discrimination means for discriminating levels of output signal of said phase selecting means, first time-current operating means for performing a first time-current operation when said output signal from phase selecting means is discriminated to be above a level discriminated by said first level-discrimination means, second level-discrimination means for discriminating levels of output signal of said peak value detection means, second time-current operating means for performing a second time-current operation when said peak value is discriminated whether it is above a level discriminated by said second-level discrimination means, and output means for issuing the releasing signal in accordance with operations of said first and second time-current operating means.

3. An overcurrent detector in accordance with claim 1, wherein said processing means includes a microcomputer for processing said output signal of the signal conversion means and comprises:

first level-discrimination means for discriminating levels of output signal of said phase selecting means, first time-current operating means for performing a first time-current operation when said output signal from phase selecting means is discriminated whether it is above a level discriminated by said first level-discrimination means, second level-discrimination means for discriminating levels of output signal of said peak value detection means, second time-current operating means for performing a second time-current operation when said peak value is discriminated whether it is above a level discriminated by said second-level discrimination means, current conversion means for converting output of said signal conversion means into current value, and third time-current operating means for performing a third time-current operation when said output signal from signal converison means is discriminated whether it is above a level discriminated by said current conversion means.

4. An overcurrent detector in accordance with claim 2, wherein
said second level discrimination means takes as a theshold value the difference between a microcomputer controlled D/A converted output from said microcomputer and a predetermined value.

5. A circuit breaker comprising:
a disconnectable contact provided in an A.C. power line,
current sensor means provided for respective phases of AC power lines for detecting a value of current,
phase selecting means for selectively outputting one phase signal having a largest waveform from among three phase signals inputted thereto from said current sensor means outputting at least one half cycle of said one phase signal,
peak value detection means for detecting a largest instantaneous value from instantaneous values of said sensing outputs,
signal conversion means for obtaining a mean square ($Im^2$) of output of said phase selecting means,
processing means which processes an output signal of said signal conversion means to issue a releasing signal, and
releasing means for inducing disconnection of said disconnectable contact in response to said releasing signal.

6. A circuit breaker in accordance with claim 5, wherein said processing means includes a microcomputer and comprises:
first level-discrimination means for discriminating levels of output signal of said phase selecting means,
first time-current operating means for performing a first time-current operation when said output signal from the phase selecting means is discriminated to be above a level discriminated by said first level-discrimination means,
second level-discrimination means for discriminating levels of output signal of said peak value detection means,
second time-current operating means for performing a second time-current operation when said peak value is discriminated whether it is above a level discriminated by said second-level discrimination means,
output means and for issuing the releasing signal in accordance with operations of said first and second time-current operating means.

7. A circuit breaker in accordance with claim 5, wherein said processing means includes a microcomputer and comprises:
first level discrimination means for discriminating levels of output signal of said phase selecting means,
first time-current operating means for performing a first time-current operation when said output signal from phase selecting means is discriminated whether it is above a level discriminated by said first level discrimination means,
second level-discrimination means for discriminating levels of output signal of said peak value detection means,
second time-current operating means for performing a second time-current operation when said peak value is discriminated whether it is above a level discriminated by said second level discrimination means,
current conversion means for converting output of said signal conversion means into current value, and
third time-current operation means for performing a third time-current operation when said output signal from signal conversion means is discriminated whether it is above a level discriminated by said current conversion means.

8. A circuit breaker in accordance with claim 6, wherein
said second level discrimination means takes as a threshold value a difference between said microcomputer controlled D/A converted output from said microcomputer and a predetermined value.

* * * * *